United States Patent

[11] 3,597,656

| [72] | Inventor | Ellwood S. Douglas<br>Orinda, Calif. |
|---|---|---|
| [21] | Appl. No. | 19,625 |
| [22] | Filed | Mar. 16, 1970 |
| [45] | Patented | Aug. 3, 1971 |
| [73] | Assignee | The Rucker Company<br>Oakland, Calif. |

[54] MODULATING GROUND FAULT DETECTOR AND INTERRUPTER
23 Claims, 8 Drawing Figs.

[52] U.S. Cl...................................................... 317/18 R,
317/27 R
[51] Int. Cl...................................................... H02h 3/32,
H02h 3/28
[50] Field of Search............................................ 317/18, 26,
27, 28, 29; 340/253, 255, 253 A, 253 H, 253 N,
253 Q, 253 Y; 307/94, 131

[56] References Cited
UNITED STATES PATENTS

| 2,676,284 | 4/1954 | Bechberger................... | 317/27 (X) |
| 3,165,671 | 1/1965 | Mintz............................ | 317/18 (DX) |
| 3,356,939 | 12/1967 | Stevenson..................... | 317/18 (X) |
| 3,512,045 | 5/1970 | Tipton........................... | 317/27 (X) |

Primary Examiner—J. D. Miller
Assistant Examiner—Harvey Fendelman
Attorney—Flehr, Hohbach, Test, Albritton and Herbert ABSTRACT: Ground fault detector and interrupter in which a ground fault signal is modulated onto a carrier signal before it is processed. After processing, the modulated carrier is demodulated, and the fault signal is available for actuating a current interrupter or other monitoring device.

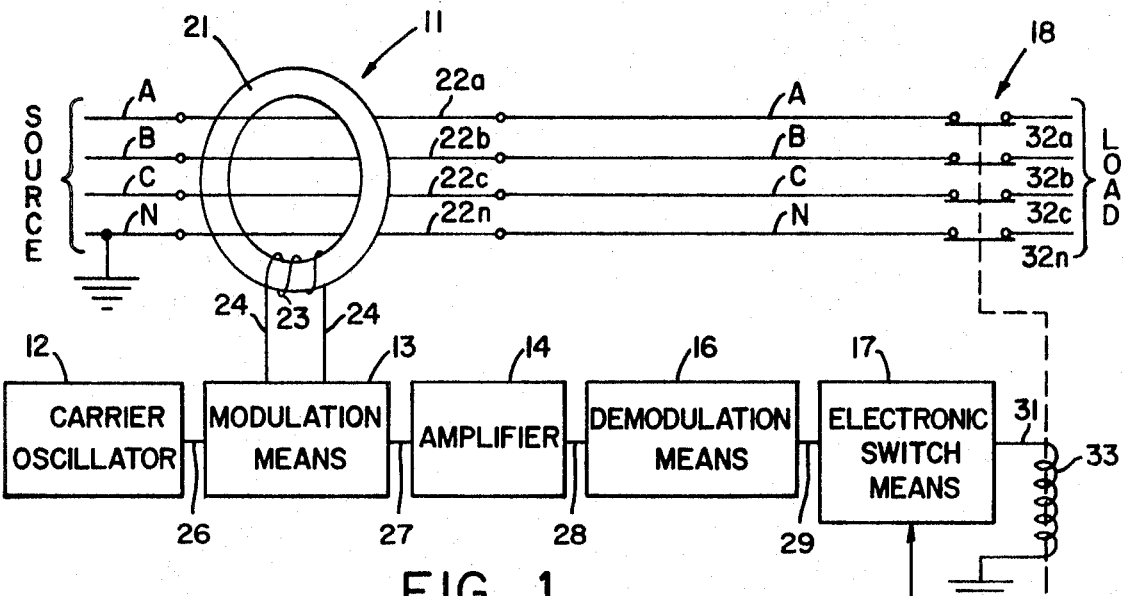
FIG_1
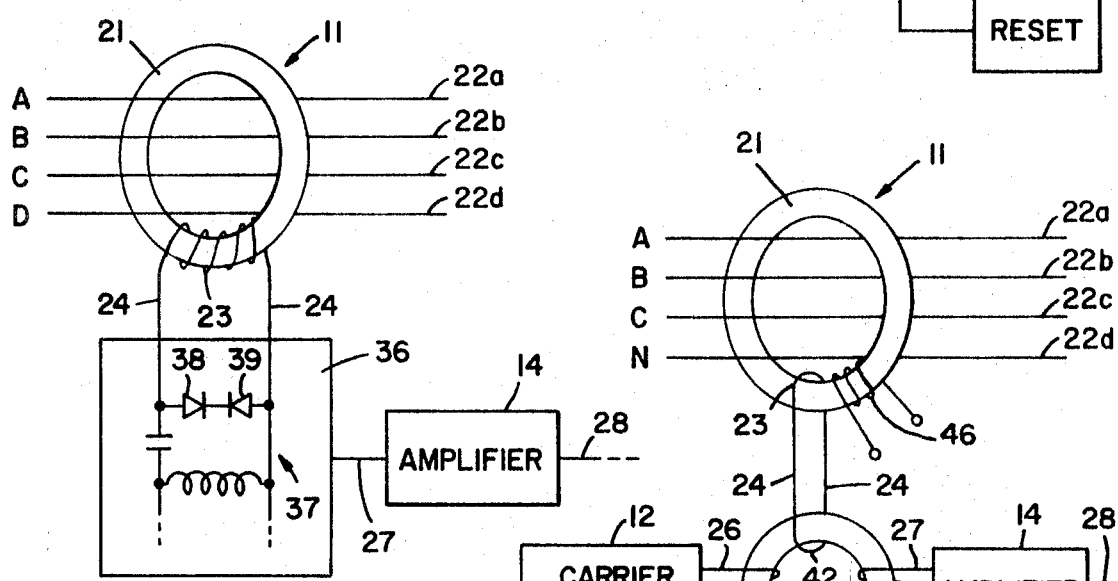
FIG_2
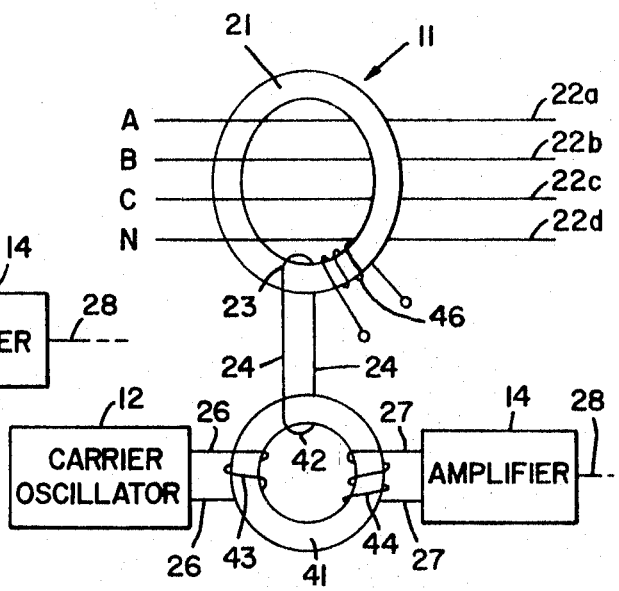
FIG_3
FIG_4
INVENTOR.
ELLWOOD S. DOUGLAS
BY
Flehr, Hohbach, Test,
Albritton & Herbert
ATTORNEYS

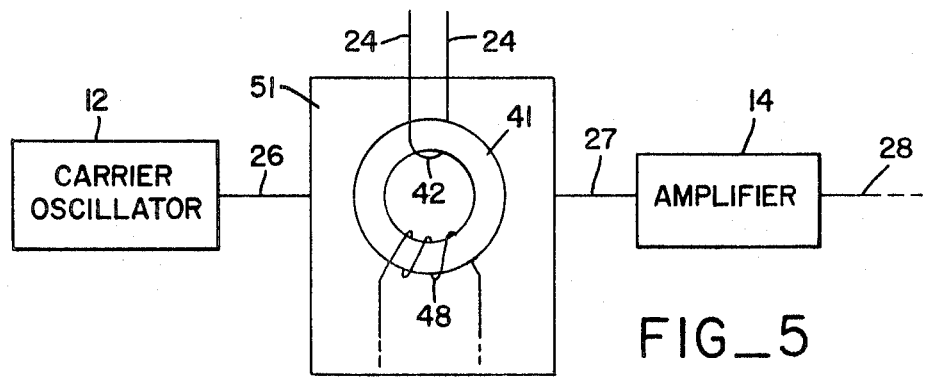
FIG_5
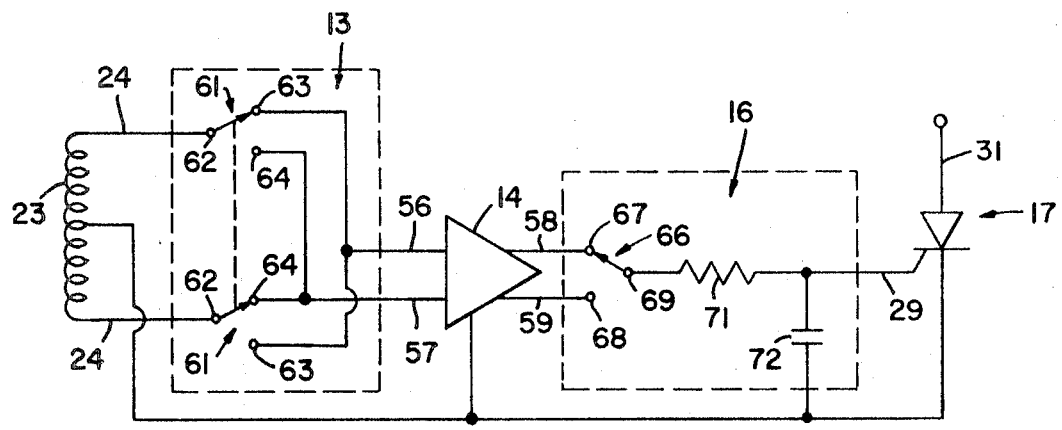
FIG_6
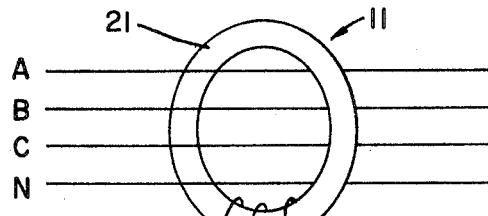
FIG_7
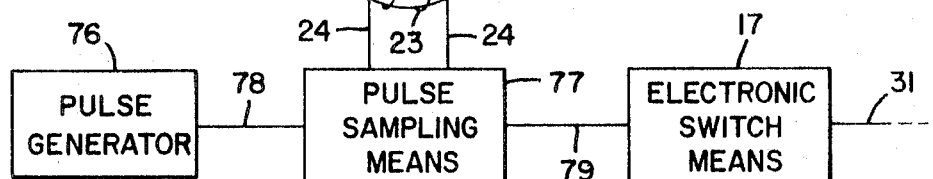
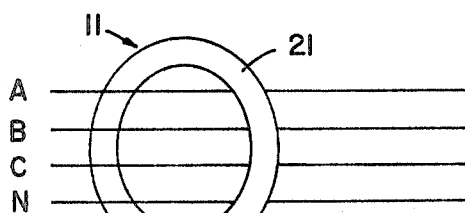
FIG_8
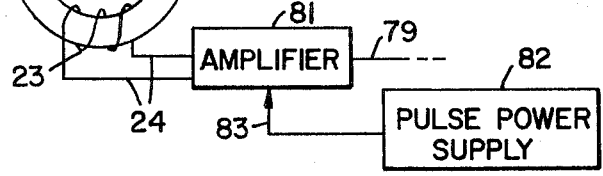

MODULATING GROUND FAULT DETECTOR AND INTERRUPTER

BACKGROUND OF THE INVENTION

This invention pertains to a system and method for detecting ground faults in an electrical circuit and interrupting the flow of current in the circuit in response to such faults.

In ground fault detectors and interrupters heretofore provided, differential transformers have been utilized for detecting when the current flowing through conductors from a source toward a load is not equal to the current flowing back through the conductors toward the source. The ground fault interrupters also commonly include an electromechanical device, such as a circuit breaker or relay, for interrupting the flow of current in the conductors. Operating power for the electromechanical device is generally derived from the output of the differential transformer.

In the early ground fault interrupters utilizing differential transformers, the output of the differential transformer was connected directly to the trip coil of the circuit breaker or relay. Such systems had very low sensitivity, and they required transformers having a high mutual inductance to provide enough power to operate the circuit breaker or relay directly. Additional relays have been connected between the differential transformer and circuit breaker or current interrupting relay to increase the sensitivity of the device and decrease the power requirement on the differential transformer. While the electromechanical amplifier provides some improvement over the directly coupled system, this improvement is limited by factors such as dirt, corrosion, contact bounce, and acoustical noise which can impair the performance of the relays used in such amplifiers.

In recent years, electronic amplifiers and switches have been utilized to increase the output of the differential transformer to a level sufficient for tripping the circuit breaker or current interrupting relay. Such amplifies and switches have provided a substantial improvement over the electromechanical amplifiers with respect to the sensitivity of the system and the power required of the differential transformer. However, the electronic amplifiers and switches themselves impose limitations on the performance of the system. While there is little problem in finding an amplifier having sufficient gain to provide all of the power required for operating the circuit breaker or relay, most amplifiers have imperfections which produce noise or other spurious signals which are amplified to the same extent as the desired input signal. In ground fault interrupters, it is important that the amplified fault signal be unmistakably larger than any variations due to imperfections in the amplifier itself. Therefore, the sensitivity of ground fault interrupters using electronic amplifiers is limited to fault signals which are substantially larger than the maximum variations due to imperfections in the amplifier itself. Some attempts have been made at reducing amplifier input variations by improving the quality of the amplifiers through the use of premium components, balanced circuits made of matched pairs, and the like. However, such amplifiers are costly to make and are difficult to manufacture in large quantities.

There is, therefore, a need for a new and improved ground fault detector and current interrupter which overcomes the foregoing and other problems encountered with ground fault detectors and interrupters heretofore provided.

SUMMARY AND OBJECTS OF THE INVENTION

The ground fault detector and current interrupter of the present invention includes means for modulating the fault signal from a differential transformer onto a carrier signal before it is amplified. After amplification, the carrier signal is demodulated to provide a fault signal of sufficient magnitude to operate a circuit breaker or other current interrupter. Both electronic and magnetic circuits are provided for utilizing various types of modulation, such as amplitude, frequency, phase, contact, and pulse sampling modulation.

It is in general an object of the present invention to provide a new and improved ground fault detector and method.

Another object of the invention is to provide a ground fault detector and method of the above character in which the fault signal is modulated onto a carrier signal.

Additional objects and features of the invention will be apparent from the following description in which the preferred embodiments are set forth in detail in conjunction with the accompanying drawing.

BRIEF DESCRIPTION OF THE DRAWING

FIG. 1 is a circuit diagram of one embodiment of a modulating ground fault detector and interrupter incorporating the present invention.

FIG. 2 is a circuit diagram of one embodiment of a frequency modulator which can be used in the system shown in FIG. 1.

FIG. 3 is a circuit diagram of one embodiment of a magnetic amplitude modulator which can be incorporated in the system illustrated in FIG. 1.

FIG. 4 is a diagram of one embodiment of a magnetic frequency modulator which can be incorporated in the ground fault detector and interrupter illustrated in FIG. 1.

FIG. 5 is a diagram of one embodiment of a magnetic phase modulator which can be incorporated in the system illustrated in FIG. 1.

FIG. 6 is a circuit diagram of one embodiment of a contact modulator incorporating the present invention.

FIG. 7 is a circuit diagram of one embodiment of a pulse sampling modulator which can be incorporated in the system illustrated in FIG. 1.

FIG. 8 is a diagram of another embodiment of a pulse sampling modulator which can be incorporated in the system illustrated in FIG. 1.

DESCRIPTION OF THE PREFERRED EMBODIMENTS

The ground fault detector and method of the present invention can be utilized in any power distribution system having a return path to ground at the source. Thus, it can be used in conventional single phase or polyphase circuits consisting of two, three, or four wires, as long as some form of ground return is provided at the source. In the drawings, the invention is illustrated in connection with a three-phase, four-wire system consisting of three ungrounded conductors A, B, and C, and a grounded neutral conductor N.

The embodiment illustrated in FIG. 1 includes a differential transformer 11, a carrier oscillator 12, modulation means 13, an amplifier 14, demodulation means 16, electronic switch means 17, current interrupter means 18, such as a circuit breaker of relay, and reset means 19 for resetting the circuit breaker or relay.

The differential transformer 11 includes a generally toroidal core 21 fabricated of a magnetic material having a high permeability. This transformer also includes a plurality of primary windings 22a—22n passing through the toroidal core. Theses windings are connected in series with the conductors A—N, respectively. Each of the primary windings makes the same number of turns around the toroidal core, and in the preferred embodiment they simply pass through the core to form single turn windings. The arrangement of the primary windings is such that under normal conditions in the distribution circuit, the total magnetomotive force produce by the primary windings 22a—22n in the magnetic core 21 is balanced out so that the net flux in the core 21 is equal to zero. Under abnormal conditions, such as when current flows to ground in the load, the current flowing through the primary windings toward the load is greater than the current flowing back to the source through these windings, and a nonzero net flux is produced in the core 21.

The differential transformer 11 also includes a secondary winding 23 in which a fault signal is induced when a nonzero magnetic flux exists in the core 21. This winding consists of at least one turn on the core, and it is connected to the modulation means 13 by conductors 24, 24.

The carrier oscillator 12 provides means for generating a carrier signal for modulation by the fault signal. This carrier should preferably have a frequency substantially greater than that of the fault signal, and in the preferred embodiment the carrier signal is a radio frequency signal. The oscillator 12 can be of conventional design. The output of the carrier oscillator 12 is applied to the carrier input of the modulation means 13.

The modulation means 13 provides means for modulating the fault signal onto the carrier signal. In one presently preferred embodiment, the modulation means 13 comprises a conventional amplitude modulator. However, if desired, other well known types of modulators, such as frequency and phase modulators, can be used. The modulator can utilize any of the conventional electronic elements such as vacuum tubes, vacuum diodes, transistors, and semiconductor diodes, or it can use magnetic and mechanical devices.

The output of the modulation means 13 is connected to the input of the amplifier 14 through a circuit 27. This amplifier is a conventional design and provides means for amplifying the modulated carrier signal. In the preferred embodiment, it is a radio frequency amplifier since the carrier is a radio frequency signal. The output of the amplifier 14 is connected to the input of the demodulation means 16 through a circuit 28.

The demodulation means 16 provides means for demodulating the amplified carrier signal to recover the fault information impressed thereon. It comprises a demodulator of conventional design and of a type corresponding to the type of modulator used in the modulation means 13. The output of the demodulation means is connected to the input of the electronic switch means 17 through a circuit 29.

The electronic switch means 17 includes an electronic switching device such as a silicon controlled rectifier or switching transistor. This switch is connnected to the operating coil of the circuit breaker or relay 18 through a circuit 31 and provides means for energizing the coil with current from a fixed power source in response to a fault signal. Alternatively, if desired, the electronic switch can be eliminated and the circuit breaker or relay coil energized directly with the amplified fault signal output from the demodulation means 16.

The current interrupter means 18 comprises a circuit breaker or relay of conventional design having a plurality of contacts 32a—32n connected in the distribution system conductors A—N, respectively. This circuit breaker or relay also includes an operating coil 33 connected to the electronic switch means 17 through the circuit 31 and adapted for opening the contacts 32a—32n in response to a fault signal.

The reset means 19 provides means for resetting the contacts of the current interrupter means 18 to their normally closed position after a ground fault has been corrected. It can include either mechanical or electromechanical means for resetting the contacts, and it can also include means for resetting the electronic switch.

Operation of the ground fault detector and interrupter illustrated in FIG. 1 can now be described briefly. Let it be assumed that the conductors A—N have been connected to a source of electrical energy and to a load. Under normal operating conditions, that is in the absence of a ground fault, the currents passing through the primary winding of the differential transformer 11 are balanced, and the net flux in the magnetic core 21 is zero. When a ground fault occurs, this current balance is destroyed, and a nonzero net flux is produced in the core 21. A fault signal in the form of a voltage is produced in the secondary winding 23 and coupled to the modulation means 13. The carrier signal produced by the oscillator 12 is modulated with this fault signal, and the modulated carrier signal is amplified by the amplifier 14. The amplified signal is demodulated to remove the fault information from the carrier. This fault information actuates the electronic switch, energizing the circuit breaker coil 33 and opening the contacts 32a—32n to interrupt the flow of current in the conductors A—N. When the ground fault has been corrected, the circuit breaker and electronic switch can be reset to their normal conditions by means of the reset means 19.

FIG. 2 illustrates one embodiment of a frequency modulator for impressing the fault signal information on a carrier. This embodiment includes an oscillator 36 having a tuned circuit 37 for determining the frequency of the oscillator. This tuned circuit includes a pair of diodes 38, 39 the capacitance of which is dependent upon the voltage applied across the diodes. Alternatively, if desired, other types of elements having a reactance dependent on voltage and/or current can be utilized in place of the diodes 38, 39. The cathodes of the diodes are connected together, and the anodes are connected to the secondary winding 23 of the differential transformer 11 through the conductors 24. Thus, the frequency of the oscillator 36 is dependent upon the voltage in the secondary winding 23, and the signal produced by the oscillator is modulated by the fault signal in the secondary winding. The output of the oscillator 36 is connected to the input of the amplifier 14 through the circuit 27 and passes through the remainder of the circuit in the manner described hereinbefore.

FIG. 3 illustrates a magnetically operated amplitude modulator which can be utilized in the present invention. This modulator includes a reactor core 41 having a first winding 42 connected to the secondary winding 23 of the differential transformer through the conductors 24. The core 41 is a nonlinear device in that it is capable of delivering an output signal which is a nonlinear function of one or more input signals to the core. While in FIG. 3 the windings 23 and 42 are shown as consisting of a single turn on their respective cores, additional turns can be provided if desired. The output of the carrier oscillator 12 is connected to a second winding 43 on the reactor core 41 through conductors 26. An output winding 44 is provided on the core 41 and is connected to the input of the amplifier 14 through conductors 27. The output of the amplifier 14 is connected to the remainder of the circuit in the manner described hereinbefore. Alternately, if desired, a tertiary winding 46 can be provided on the core 21 of the differential transformer, and the output of the magnetic modulator can be taken from this winding.

Operation and use of the magnetic amplitude modulator can now be described briefly. The carrier signal from the oscillator 12 produces a certain magnetic flux in the reactor core 41 at all times. This flux induces a voltage in the output winding 44. In the absence of a fault signal, no additional flux is produced by the winding 42. When a ground fault occurs, the fault signal produced in the winding 23 is coupled to the winding 42 to produce additional flux in the nonlinear core 41. This additional flux combines with the flux from the carrier signal to produce in the winding 44 a signal which is modulated in amplitude in accordance with the fault signal.

FIG. 4 shows a magnetically operated frequency modulator which can be utilized in the present invention. In this modulator, the reactor core 41 is used in a tuned circuit 46 which determines the frequency of an oscillator 47. The winding 42 on the core 41 is coupled to the secondary winding 23 of the differential transformer in the manner described hereinbefore. An additional winding 48 is wound on the reactor core to provide an inductor having a reactance dependent upon the voltage produced in the secondary winding of the differential transformer. Thus, the frequency of the signal produced by the oscillator 47 is dependent upon the fault signal. The output of the oscillator is coupled to the input of the amplifier 14 through the circuit 27, and the remainder of the system is similar to that described hereinbefore.

In the embodiment illustrated in FIG. 5, the reactor core 41 is used in a conventional phase shifting network 51 to provide magnetic phase modulation of the carrier signal. As in the previous embodiment, the winding 48 is wound on the reactor core 41 to provide an inductor having a reactance dependent upon the fault signal produced in the secondary winding of the differential transformer. The carrier signal from the oscillator 12 is connected to the phase shift network 51 through the circuit 26, and the output of the network is connected to the input of the amplifier 14 though the circuit 27. In operation, the phase shift network modulates the carrier signal by shifting its phase in accordance with the fault signal from the differential transformer.

FIG. 6 illustrates a contact modulator which can be utilized in the ground fault detector and interrupter of the present invention. In this embodiment, the amplifier 14 is an operational amplifier having a noninverting input 56 and an inverting input 57 and outputs 58 and 59 associated with the inputs 56 and 57, respectively. The contact modulator provides means for applying the fault signal from the differential transformer secondary winding 23 alternately to the inputs 56 and 57 of the operational amplifier. As illustrated in FIG. 6, the contact modulator includes a pair of single-pole, two-position switches 61. Each of these switches includes a pole 62 connected to the secondary winding 23 through one of the conductors 24, a first terminal 63 connected to the noninverting amplifier input 56, and a second terminal 64 connected to the inverting input 57. The switches 61 are ganged for operation together, as shown, and in the preferred embodiment they operate at a frequency on the order of 400 Hertz. Suitable switches can be provided by a conventional vibrator or chopper.

The demodulation means 16 in this embodiment includes means for alternately passing the signals from the amplifier output associated with each of the amplifier inputs. As illustrated, this demodulator includes a single-pole, two-position switch 66. This switch includes terminals 67 and 68 which are connected to the outputs 58 and 59, respectively, and can be of the same type as the switches 61. It should preferably operate at the same frequency as the switches 66 and in phase with them. The demodulator also includes a low pass filter consisting of a resistor 71 and a capacitor 72. One side of this filter is connected to the pole 69 of the switch 66, and the other side of the filter is connected to the electronic switch means 17 through the circuit 29. In this figure, the electronic switch means is illustrated as a silicon controlled rectifier.

Operation of the circuit illustrated in FIG. 6 can now be described briefly. Let it be assumed that the amplifier 14 has a gain of 100 and an input offset of 6 millivolts. In the absence of a fault signal, the signal appearing at the pole 69 in the demodulator will be a 1200 millivolt square wave averaging 0 volts. This signal is reduced by the low pass filter to a square wave having a peak-to-peak voltage of approximately 150 millivolts. Now let it be assumed that a 6 millivolt fault signal appears across the secondary winding 23 of the differential transformer. This signal is applied alternately to the two inputs of the amplifier 14 at the same rate at which the outputs are sampled, with the result at the signal at the pole 69 of the switch in the demodulator is a DC signal with an amplitude of 600 millivolts. This signal passes unimpeded through the low pass filter to actuate the silicon controlled rectifier.

FIG. 7 illustrates a pulse sampling modulator which includes a pulse generator 76 and pulse sampling means 77. The pulse generator 76 can be of conventional design and supplies a train of pulses to the pulse sampling means through a circuit 78. The secondary winding 23 of the differential transformer is connected to the pulse sampling means through conductors 24. The pulse sampling means can be of conventional design and provides means for sampling the fault signal produced in the secondary winding at a rate determined by the pulse train. The output of the pulse sampling means is connected to the electronic switch means 17 through a circuit 79. Since conventional switching devices such as triacs and silicon controlled rectifiers require an input of only a few microseconds duration, the fault signal can be sampled at intervals of short duration. The switching device is not exposed to possible noise pulses except during the sampling time, thereby greatly reducing the possibility of false tripping. Since short pulses can be handled by small transformers, transformer coupling is practical in small space. A further reduction in size and power dissipation can be realized by supplying operating power to the circuit in the form of pulses.

FIG. 8 illustrates a pulsesampling system which comprises an amplifier 81 and a pulsating power supply 82 connected for supplying operating power to the amplifier through a circuit 83. The secondary winding of the differential transformer is connected to the amplifier 81 through the circuits 24. The output of the amplifier is connected to the remainder of the circuit through the conductor 79 in the manner described hereinbefore. In this embodiment, the amplifier 81 is alternately turned on and off by the pulsating power supply 82 to provide sampling of the fault signal.

It is apparent from the foregoing that a new and improved ground fault interrupter and method have been provided. Modulating the ground fault signal onto a carrier results in improvements in performance and reductions in size and cost which cannot be realized with ground fault detectors and interrupters of the types heretofore provided.

While only certain presently preferred embodiments have been described herein, as will be apparent to those familiar with the art, certain changes and modifications can be made without departing from the scope of the invention as defined by the following claims.

I claim:

1. In a protective device for detecting currents to ground in power distribution systems having a plurality of conductors carrying current between a source and a load, sensing means adapted for monitoring the flow of current in the conductors and producing a fault signal whenever the total current flowing toward the load is not equal to the current flowing back to the source through the conductors, modulation means connected for receiving the fault signal from said sensing means and modulating a carrier signal with said fault signal, and demodulation means for demodulating the modulated carrier signal to recover the fault signal.

2. A protective device as in claim 1 together with amplification means connected intermediate the modulation and demodulation means for amplifying the modulated signal.

3. A protective device as in claim 1 together with current interrupting means connected for interrupting the flow of current in the distribution system conductors in response to the fault signal from said demodulation means.

4. A protective device as in claim 3 wherein said current interrupting means includes contacts connected in series with said conductors, an operating coil for controlling said contacts, and switching means responsive to the fault signal from said demodulator means for controlling the flow of current to said operating coil.

5. A protective device as in claim 1 wherein said sensing means includes a differential transformer.

6. In a ground fault current interrupter for interrupting the flow of current in power distribution system having a plurality of conductors carrying current between a load and a source, a differential transformer having a plurality of primary windings connected in the conductors and a secondary winding in which a fault signal is produced whenever the current flowing through the primary windings toward the load is not equal to the current flowing back toward the source through said windings, means for generating a carrier signal, modulation means connected for receiving the fault and carrier signals and adapted for impressing the information carried by the fault signal onto the carrier signal, amplification means or amplifying the signal from said modulation means, demodulation means for removing the fault information from the amplified signal, and current interrupting means controlled by the fault information from said demodulation means for interrupting the flow of current in the distribution system conductors in response to the fault signal.

7. A ground fault current interrupter as in claim 6 wherein said current interrupting means includes at least one normally closed contact connected in at least one of said conductors and an operating coil for opening said contact.

8. A ground fault current interrupter as in claim 7 together with switching means connected intermediate said demodulation means and said operating coil.

9. A ground fault current interrupter as in claim 6 wherein said modulation means includes an amplitude modulator.

10. A ground fault current interrupter as in claim 6 wherein said modulation means includes a frequency modulator.

11. A ground fault current interrupter as in claim 6 wherein said modulation means includes a phase modulator.

12. In a ground fault current interrupter for interrupting the flow of current in power distribution system having a plurality of conductors carrying current between a load and a source, sensing means adapted for monitoring the flow of current in the conductors and producing a fault signal whenever the total current flowing toward the load is not equal to the current flowing back to the source through the conductors, pulse generating means, pulse sampling means connected to the sensing and pulse generating means for sampling the fault signal at a rate determined by the rate of pulses from said generating means, switching means connected to said sampling means and controlled by the sampled fault signal, and current interrupting means controlled by said switching means for interrupting the flow of current in the distribution system conductors upon the occurrence of a ground fault.

13. A ground fault current interrupter as in claim 12 wherein said pulse sampling means includes an amplifier which derives its operating power from said pulse generating means in such manner that said amplifier alternates between on and off conditions at a rate determined by said pulse generating means.

14. In a ground fault current interrupter for interrupting the flow of current in power distribution system having a plurality of conductors carrying current between a load and a source sensing means adapted for monitoring the flow of current in the conductors and producing a fault signal whenever the total current flowing toward the load is not equal to the current flowing back to the source through the conductors, amplifier means having an input and an output, modulation means connected intermediate said sensing means and said amplifier means and adapted for applying the fault signal intermittently to the input of said amplifier means, and demodulation means connected to the output of said amplifier means for intermittently passing the signal from said output.

15. A ground fault current interrupter as in claim 14 wherein said amplifier means comprises an operational amplifier having inverting and noninverting inputs.

16. In a protective device for detecting currents to ground in power distribution systems having a plurality of conductors carrying current between a source and a load, a differential transformer having a plurality of primary windings connected in the conductors and a secondary winding in which a fault signal is produced whenever the current flowing through the primary windings toward the load is not equal to the current flowing back toward the source through said windings, means for generating a carrier signal, magnetic modulation means including a reactor core coupled to the secondary winding of said differential transformer and adapted for modulating a carrier signal in accordance with the fault signal, and demodulation means for demodulating the modulated carrier signal to recover the fault signal.

17. A protective device as in claim 16 together with means for generating a carrier signal and means for delivering the carrier and fault signals to the reactor core in such manner that said carrier signal is amplitude modulated by said faults signal in said reactor core.

18. A protective device as in claim 16 wherein said reactor core is utilized in a frequency determining element in an oscillator to produce a frequency modulated signal varying in accordance with said fault signal.

19. A protective device as in claim 16 wherein said reactor core constitutes an element in a phase shifting network for phase modulating the carrier signal in accordance with said fault signal.

20. In a method for detecting ground fault currents in a power distribution system of the type having a plurality of conductors between a source and a load, the steps of monitoring the flow of current in said conductors and producing a fault signal whenever the total currents flowing to and from the load in the conductors are not equal, modulating said fault signal onto a carrier signal, amplifying the modulated signal, and demodulating the amplified signal to recover the fault information carried thereby.

21. A method as in claim 20 together with the additional steps of connecting current interrupting contacts in said conductors, said contacts adapted to be opened by an operating coil, and energizing said operating coil in response to the fault information from said carrier signal.

22. In a method for detecting ground fault currents in a power distribution system of the type having a plurality of conductors between a source and a load, the steps of monitoring the flow of current in said conductors and producing a fault signal whenever the total currents flowing to and from the load in the conductors are not equal, sampling said fault signal at a predetermined rate, and using the sampled fault signal for triggering a switching device to interrupt the flow of current in the distribution system conductors in response to a ground fault current.

23. A method as in claim 22 wherein said fault signal is sampled at a predetermined rate by means of a contact modulator.